(12) United States Patent
Nicholls et al.

(10) Patent No.: US 10,196,037 B2
(45) Date of Patent: Feb. 5, 2019

(54) VEHICLE ACCESS SYSTEM AND METHOD

(71) Applicants: JAGUAR LAND ROVER LIMITED, Whitley, Coventry, Warwickshire (GB); JAGUAR LAND ROVER, Whitley, Coventry, Warwickshire (GB)

(72) Inventors: Stephen Nicholls, Coventry (GB); Christopher Meredith, Coventry (GB); Immad Mir, Coventry (GB); Kevin Cockings, Coventry (GB); Dirk Parker, Coventry (GB); Damian Ward, Coventry (GB); Urmila Mistry, Coventry (GB); Hadric Khanu, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/438,290

(22) PCT Filed: Oct. 28, 2013

(86) PCT No.: PCT/EP2013/072540
§ 371 (c)(1),
(2) Date: Apr. 24, 2015

(87) PCT Pub. No.: WO2014/064297
PCT Pub. Date: May 1, 2014

(65) Prior Publication Data
US 2015/0291126 A1 Oct. 15, 2015

(30) Foreign Application Priority Data
Oct. 26, 2012 (GB) .................................. 1219261.3

(51) Int. Cl.
*G07C 9/00* (2006.01)
*B60R 25/20* (2013.01)
(Continued)

(52) U.S. Cl.
CPC .......... *B60R 25/2054* (2013.01); *B60R 25/24* (2013.01); *E05F 15/73* (2015.01); *G07C 9/00309* (2013.01); *G07C 2209/64* (2013.01)

(58) Field of Classification Search
None
See application file for complete search history.

(56) References Cited

U.S. PATENT DOCUMENTS 5,734,245 A * 3/1998 Terashima .......... G05B 19/4061
318/453
5,739,598 A * 4/1998 Zatler .................... G01F 23/265
307/112

(Continued)

FOREIGN PATENT DOCUMENTS

CN 103620148 A * 3/2014 ......... B60R 25/2054
DE 102005062455 A1 7/2007
(Continued)

OTHER PUBLICATIONS

English translation of WO 2012073821 A1 to Ikeda et al. from google patents (Aug. 10, 2018).*

(Continued)

*Primary Examiner* — Jean Paul Cass
(74) *Attorney, Agent, or Firm* — Carlson, Gaskey & Olds

(57) ABSTRACT

The present invention relates to a vehicle access system (1) having a tracking means (11; 23, 25, 27) for tracking a positional movement pattern of a user (D) relative to a vehicle (3). A controller (9) is provided for controlling the opening and/or closing of a vehicle opening (5). The controller (9) communicates with a storage device (15) and the tracking means (11; 23, 25, 27). The controller (9) has a comparator (17) for comparing the positional movement pattern with one or more pre-defined movement maps stored in the storage device (15). The controller is configured to open the vehicle opening when the comparator (17) deter- (Continued)

mines that the positional movement pattern corresponds to a first of the pre-defined movement maps. Alternatively, or in addition the controller can be configured to close the vehicle opening when the comparator (17) determines that the positional movement pattern corresponds to a second of said pre-defined movement maps. The invention also relates to a method of opening/closing a vehicle opening.

14 Claims, 8 Drawing Sheets

(51) Int. Cl.
*B60R 25/24* (2013.01)
*E05F 15/73* (2015.01)

(56) References Cited

U.S. PATENT DOCUMENTS

| | | | |
|---|---|---|---|
| 5,801,501 A * | 9/1998 | Redelberger | F16H 1/16 318/283 |
| 5,929,769 A | 7/1999 | Garnault | |
| 6,361,207 B1 * | 3/2002 | Ferguson | G01K 7/22 333/22 R |
| 6,472,836 B1 * | 10/2002 | Uebelein | H02H 7/0851 318/434 |
| 6,552,649 B1 | 4/2003 | Okada et al. | |
| 7,402,971 B2 * | 7/2008 | Averitt | E05F 15/40 318/266 |
| 7,530,199 B2 * | 5/2009 | Yokomori | E05F 15/646 49/506 |
| 7,863,846 B2 * | 1/2011 | Biskup | B62D 35/007 318/466 |
| 8,818,646 B2 * | 8/2014 | Heinrich | H02H 6/005 318/434 |
| 9,058,035 B2 * | 6/2015 | Schlesiger | G05B 24/02 |
| 2002/0027547 A1 * | 3/2002 | Kamijo | G04G 21/00 345/157 |
| 2004/0075046 A1 * | 4/2004 | Beggs | E06B 9/13 250/221 |
| 2004/0075548 A1 * | 4/2004 | Beggs | G01V 8/20 340/522 |
| 2006/0232052 A1 * | 10/2006 | Breed | B60R 21/013 280/735 |
| 2007/0146120 A1 | 6/2007 | Kachouh | |
| 2007/0228703 A1 * | 10/2007 | Breed | B60N 2/0232 280/735 |
| 2008/0022596 A1 * | 1/2008 | Boerger | E06B 9/82 49/31 |
| 2008/0165125 A1 * | 7/2008 | Hosono | G06F 1/1626 345/157 |
| 2008/0243342 A1 * | 10/2008 | Breed | B60R 21/0132 701/45 |
| 2009/0207015 A1 * | 8/2009 | Diem | G06Q 10/00 340/539.13 |
| 2009/0260289 A1 * | 10/2009 | Carpenter | E05F 5/00 49/26 |
| 2010/0211273 A1 * | 8/2010 | Kollner | E05F 15/70 701/49 |
| 2010/0296726 A1 * | 11/2010 | Rutschmann | A61B 5/0064 382/154 |
| 2011/0218709 A1 | 9/2011 | Hermann | |
| 2011/0242303 A1 | 10/2011 | Giraud et al. | |
| 2011/0257496 A1 * | 10/2011 | Terashima | G06F 19/00 600/347 |
| 2011/0282164 A1 * | 11/2011 | Yang | A61B 5/01 600/301 |
| 2012/0158253 A1 | 6/2012 | Kroemke et al. | |
| 2013/0053702 A1 * | 2/2013 | Pfeiffer | A61B 5/0064 600/476 |
| 2013/0057404 A1 * | 3/2013 | Thibault | G08B 29/22 340/545.1 |
| 2013/0234828 A1 | 9/2013 | Holzberg et al. | |
| 2013/0251206 A1 * | 9/2013 | Ishikawa | G06K 9/00624 382/103 |
| 2013/0257611 A1 * | 10/2013 | Lamb | G08B 13/02 340/501 |
| 2013/0259310 A1 * | 10/2013 | Tsukamoto | G06K 9/00362 382/103 |
| 2013/0314210 A1 * | 11/2013 | Schoner | G06K 7/10366 340/8.1 |
| 2014/0073971 A1 * | 3/2014 | Carlson | A61B 7/04 600/485 |
| 2014/0179397 A1 * | 6/2014 | Thompson | G07F 17/3209 463/20 |
| 2014/0179413 A1 * | 6/2014 | Thompson | G07F 17/3206 463/25 |
| 2014/0179435 A1 * | 6/2014 | Thompson | G07F 17/3206 463/32 |
| 2014/0206428 A1 * | 7/2014 | Thompson | A63F 13/06 463/20 |
| 2014/0270370 A1 * | 9/2014 | Saito | G06K 9/00288 382/103 |
| 2015/0047133 A1 * | 2/2015 | Sveum | B65G 69/2811 14/71.5 |
| 2015/0185851 A1 * | 7/2015 | Kauffmann | G06F 3/017 345/156 |
| 2015/0185854 A1 * | 7/2015 | Kauffmann | G06F 3/017 345/175 |
| 2015/0220777 A1 * | 8/2015 | Kauffmann | G06K 9/00362 382/103 |
| 2015/0292253 A1 * | 10/2015 | Hartmann | E05F 15/695 701/49 |
| 2016/0314587 A1 * | 10/2016 | Ishikawa | A61B 5/055 |
| 2017/0018024 A1 * | 1/2017 | Xu | G06Q 30/0643 |

FOREIGN PATENT DOCUMENTS

| | | | | |
|---|---|---|---|---|
| DE | 102009019673 A1 * | 11/2010 | | B60R 25/2054 |
| EP | 1733937 A1 | 12/2006 | | |
| EP | 2159362 A1 | 3/2010 | | |
| EP | 2753485 | 7/2014 | | |
| JP | 2009208741 A | 9/2009 | | |
| JP | 2010061443 A | 3/2010 | | |
| LU | 92069 A1 * | 3/2014 | | B60R 25/2054 |
| WO | WO 2012073821 A1 * | 12/2010 | | |
| WO | 2011026763 A1 | 3/2011 | | |
| WO | 2013034252 | 3/2013 | | |

OTHER PUBLICATIONS

Combined Search and Examination Report under Sections 17 and 18(3) for Application No. GB1219261.3 dated May 1, 2013.
PCT International Search Report for International application No. PCT/EP2013/072540 dated Jan. 30, 2014.
Combined Search and Examination Report under Sections 17 and 18(3) for Application No. GB1219262.1 dated May 1, 2013.
PCT International Search Report for International application No. PCT/EP2013/072537 dated Jan. 30, 2014.

* cited by examiner

VEHICLE ACCESS SYSTEM AND METHOD

TECHNICAL FIELD

The present invention relates to a vehicle access system and method. Aspects of the present invention relate to a system to a method and to a vehicle.

BACKGROUND

It is known to provide a powered tailgate on motor vehicles to facilitate access to the vehicle. The powered tailgate can, for example, be activated by pressing a button on a key fob. However, a potential problem arises if the user is carrying objects, such as boxes, luggage, shopping etc., and cannot readily access the key fob.

DE 202010003763 discloses a capacitive sensor arrangement mounted to a tail apron of the vehicle. The capacitor sensor arrangement is configured to detect a swivelling action of the user's foot under the tail apron. Upon detection of the swivelling action, the vehicle tail gate is opened. However, the required gesture to open the tailgate is not intuitive and could cause the user to become unbalanced.

FR 2917771 discloses a method of controlling the automatic closure of a vehicle tailgate. A series of sensors are provided at the rear of the vehicle to establish a detection zone. The closure of the tailgate is initiated by pressing a button within the vehicle and the sensors then perform a check to determine whether the user is present within the detection zone after a prescribed period of time.

The present invention sets out to overcome or ameliorate at least some of the problems associated with the aforementioned prior art techniques.

SUMMARY OF THE INVENTION

Aspects of the present invention relate to a vehicle access system for controlling the opening and/or closing of a vehicle opening. Aspects of the present invention also relate to a method of controlling access to a vehicle.

In a further aspect of the present invention, there is provided a vehicle access system comprising:
  means for tracking a positional movement pattern of a user relative to the vehicle;
  a controller for controlling the opening and/or closing of a vehicle opening, the controller being in communication with a storage device and said tracking means;
  wherein the controller comprises a comparator for comparing the positional movement pattern with one or more pre-defined movement maps stored in said storage device; and
  the controller being configured to open the vehicle opening when said comparator determines that the positional movement pattern at least substantially corresponds to a first of said one or more pre-defined movement maps; and/or to close the vehicle opening when the comparator determines that the positional movement pattern at least substantially corresponds to a second of said one or more pre-defined movement maps. The tracking means can comprise an ultrasonic range sensor and/or a capacitive range sensor which, in use, measures the distance to the user to generate said positional movement pattern. In use, the positional movement of the user (i.e. changes in the position of the user in relation to the vehicle) is tracked to identify a pattern which at least substantially corresponds to a predefined movement map. The vehicle access system can thereby implement a multi-stage recognition procedure. When the positional movement pattern matches one of said one or more predefined movement maps, the controller can initiate a corresponding control event, such as opening or closing the vehicle opening. The vehicle access system can provide automated access to the vehicle without the user having to operate an actuator, such as a handle. Rather, the user can trace a positional movement pattern which is recognised by the controller to provide access to the vehicle. The controller can be configured to send a control signal to an actuator to open/close the vehicle opening when the corresponding movement pattern is identified.

The first and second movement maps can be the same or different. Moreover, more than one movement map can be defined for opening or closing the vehicle opening. The user can trace different positional movement patterns to open or close the vehicle opening. For example, it may not be possible to trace a particular positional movement pattern because of an obstacle in the vicinity of the vehicle and the user may wish to trace an alternate positional movement pattern. The controller could be configured to enable/disable one or more movement maps based on the presence/absence of a detected obstacle, such as another vehicle or a stationary object. Alternatively, or in addition, the controller could be configured to modify a movement map based on the presence/absence of a detected obstacle. For example, when an obstacle is detected, the controller could modify the movement map to correspond to a positional movement pattern performed over reduced distances.

The first movement map can define at least one opening criterion for controlling the opening of the vehicle opening. The controller can be configured to open said vehicle opening when the comparator determines that the positional movement pattern corresponds to the or each of said at least one opening criterion defined by the first movement map. The comparator can be configured to monitor the positional movement pattern to ensure that the or each of said at least one opening criterion is satisfied in a pre-determined sequence.

The second movement map can define at least one closing criterion for controlling the closing of the vehicle opening. The controller can be configured to close said vehicle opening when the comparator determines that the positional movement pattern corresponds to the or each of said at least one closing criterion defined by the second movement map. The comparator can be configured to monitor the positional movement pattern to ensure that the or each of said at least one closing criterion is satisfied in a pre-determined sequence.

The first movement map and/or the second movement map can comprise a direction criterion relating to a direction of movement of a user relative to the vehicle. In addition or alternatively, the direction criterion can relate to an approach direction and/or a departure direction of a user. The direction criterion can be satisfied if the approach direction and/or the departure direction of the user match the stored direction criterion.

The first movement map and/or the second movement map can comprise a distance criterion relating to the distance of the user from the vehicle or a pre-defined reference point on the vehicle. The distance criterion can be satisfied if the distance between the user and the vehicle matches the stored distance criterion. The distance criterion can define a specific distance, a maximum distance or a minimum distance.

A plurality of operating zones can be defined relative to the vehicle. The movement map can define the positional movement pattern of a user as they move within or between said plurality of operating zones. For example, the movement map can define a path through a series of said operating zones. The comparator can compare the tracked positional movement pattern with the defined path to determine whether to open/close the vehicle opening.

The first movement map can comprise a timing criterion relating to a period of time the user remains within a predefined operating zone. For example, the first movement map can define a maximum or a minimum time period that the user is to remain within a first operating zone. Similarly, the second movement map can comprise a timing criterion relating to a period of time the user remains within a predefined operating zone. The timing criterion can define a maximum/minimum period of time.

The tracking means can comprises at least one range sensor for measuring the position of the user directly. The tracking means can track the distance to the user to generate the positional movement pattern. The at least one range sensor can, for example, be a capacitive sensor or an ultrasonic sensor. The at least one sensor could be a parking sensor or a blind-spot sensor, for example. Alternatively, or in addition, the tracking means can comprise at least one transceiver for communicating with a remote transceiver for measuring the position of the user indirectly. The remote transceiver can be provided in a key fob or the like to be carried on the person of the user. Determining the position of the remote transceiver allows the position of the user to be determined indirectly. The apparatus could be implemented using RF frequencies. However, the inventors have recognised that ultra-wideband technology is suitable for implementing the present invention whereby the polling signal is transmitted continually. The use of ultra-wideband transmitters and receivers allows time of flight (ToF) to be determined for communications between the vehicle and the remote transceiver.

The tracking means can be configured to monitor the position of the user within an operating zone. In particular, the tracking means can measure the range (i.e. distance) to the user within the operating zone. The tracking means can be configured to monitor the position of the user as they move relative to the vehicle within said operating zone. The positional movement pattern can be generated by said tracking means based on the movements of the user within the operating zone. The operating zone can correspond to a maximum detection range of one or more sensors forming part of the tracking means.

The tracking means can be configured to measure the distance to the user continuously. Alternatively, the tracking means can be configured to measure the distance to the user intermittently, for example at predetermined time intervals.

The vehicle access system can also include a detector for detecting the presence of a remote transceiver. A transceiver can be provided for communicating with the remote transceiver. The controller can be configured to activate the tracking means when said detector detects the presence of the remote transceiver. The tracking means can comprise at least one sensor, such as an ultrasonic sensor, which is activated to track the positional movement pattern of the user when the remote transceiver is detected by said detector. This arrangement reduces overall power consumption as the tracking means does not have to be active continuously. The activation of the tracking means in response to detection of the remote transceiver is believed to be patentable independently. The at least one sensor could be a parking sensor or a blind-spot sensor, for example. The remote transceiver can comprise an ultra-wideband transmitter and receiver.

The controller could be configured to enable opening of the vehicle opening only when the remote transceiver is within a predefined range and/or position relative to the vehicle. For example, the controller could be configured to enable opening only when the remote transceiver is detected within a range of 3 meters of the vehicle and/or within a predefined sector relative to the vehicle. The sector could be defined proximal the vehicle opening. This arrangement would provide an additional level of security.

The controller can be configured to provide feedback when the comparator determines that the movement pattern satisfies one or more of said opening/closing criteria defined by said first movement map and/or said second movement map. For example, the controller can trigger a haptic, audio or visual feedback to indicate that said one or more criteria have been satisfied. A possible haptic feedback could be provided by a vibrating device provided in a key fob associated with the vehicle. The controller could provide instructions to inform the user of the next opening/closing criterion to be performed. For example, the controller could illuminate the left or right tail lamp to direct the user to move in the corresponding direction.

The references herein to opening/closing the vehicle opening are to be understood as referring to the opening/closing of the closure member associated with that vehicle opening. The opening/closing of the closure member can comprise unlocking/locking the closure member and optionally also pivoting the closure member to an open/closed position, for example by activating an actuator or drive mechanism. The vehicle access system described herein could be implemented for opening a vehicle door or an access panel (such as a bonnet or a fuel cover). The invention has particular application when implemented to control the opening and/or closing of a tailgate. The term tailgate in the present application refers to hatches provided at the rear of the vehicle to provide access to the interior of the vehicle and includes boot (trunk) lids and the like. The tailgate can be hingedly mounted by one or more hinges provided along an upper or lower edge or along a side thereof. The present invention can also be applied to a split tailgate.

In a further aspect of the present invention, there is provided a vehicle comprising a vehicle access system as described herein.

In a still further aspect of the present invention, there is provided a method of controlling access to a vehicle, the method comprising:
  tracking a positional movement pattern of a user relative to the vehicle;
  comparing the positional movement pattern with one or more pre-defined movement maps; and
  identifying one of said pre-defined movement maps associated with the positional movement pattern and controlling access to the vehicle based on the identified movement map. An ultrasonic range sensor and/or a capacitive range sensor can be used to measure the distance to the user to generate said positional movement pattern. The movement of the user relative to the vehicle can be tracked to determine when the positional movement pattern at least substantially matches the identified pre-defined movement map. The access to the vehicle can be allowed/prevented when the positional movement pattern at least substantially matches one of said pre-defined movement maps. The method can comprise locking/unlocking and/or closing/opening a vehicle door or tailgate, for example.

The one or more pre-defined movement maps can each comprise one or more operating criterion. The comparison of the positional movement pattern can comprise the sequential comparison of each operating criterion with a component of the positional movement pattern. The vehicle door or tailgate can be opened/closed only when each operating criterion in one of said movement maps has been satisfied in the pre-defined sequence.

In a yet further aspect of the present invention, there is provided a vehicle control system comprising:
  means for tracking a positional movement pattern of a user relative to the vehicle;
  a controller for controlling a first vehicle system, the controller being in communication with a storage device and said tracking means;
  a comparator for comparing the positional movement pattern with one or more pre-defined movement maps stored in said storage device; and
  the controller being configured to operate said first vehicle system when said comparator determines that the positional movement pattern at least substantially corresponds to a first of said one or more pre-defined movement maps.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

One or more embodiments of the present invention will now be described, by way of example only, with reference to the accompanying Figures, in which.

DETAILED DESCRIPTION OF AN EMBODIMENT

Figure 1:
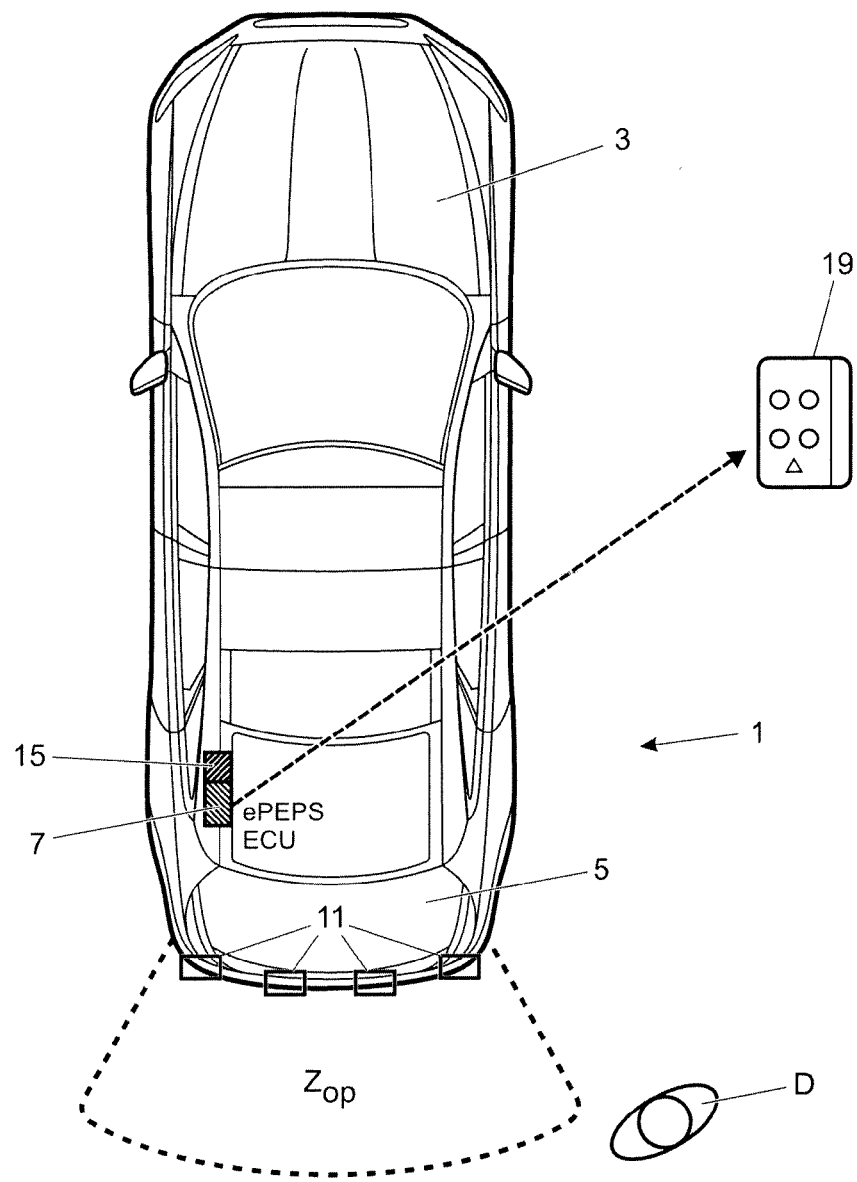
FIG. 1 shows a plan view of a vehicle having a vehicle access system according to an embodiment of the present invention.

An embodiment of a vehicle access system 1 for a motor vehicle 3 in accordance with the present invention will now be described with reference to FIG. 1. The vehicle access system 1 is configured to control opening and closing of a powered tailgate 5. The tailgate 5 is hinge mounted to the vehicle by first and second hinges (not shown). The vehicle access system 1 comprises a tailgate actuator for opening and closing the tailgate; and a tailgate locking mechanism for locking and unlocking the tailgate.

Figure 3A:
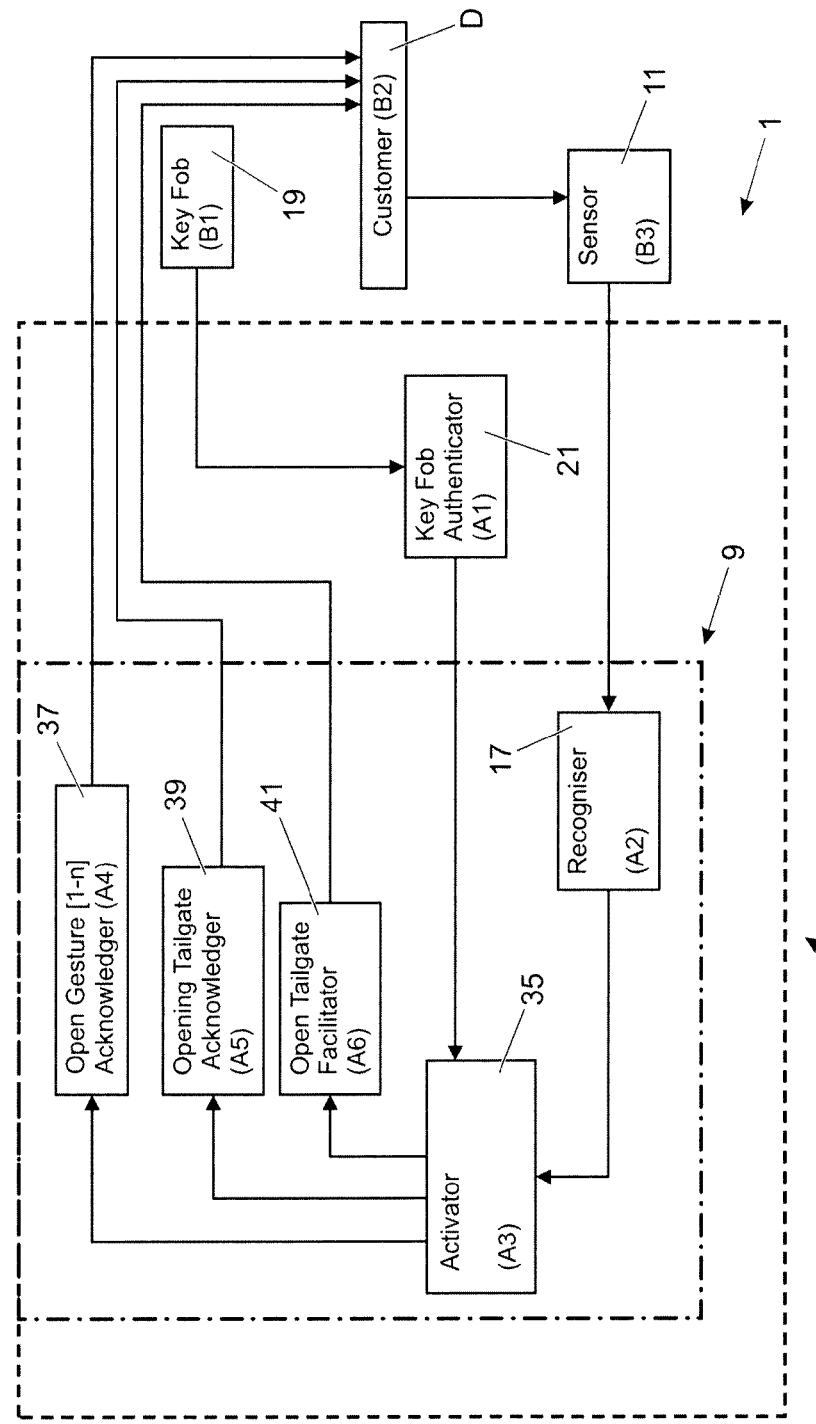
FIGS. 3A and 3B show operational flow charts for the vehicle access system.
Figure 3B:
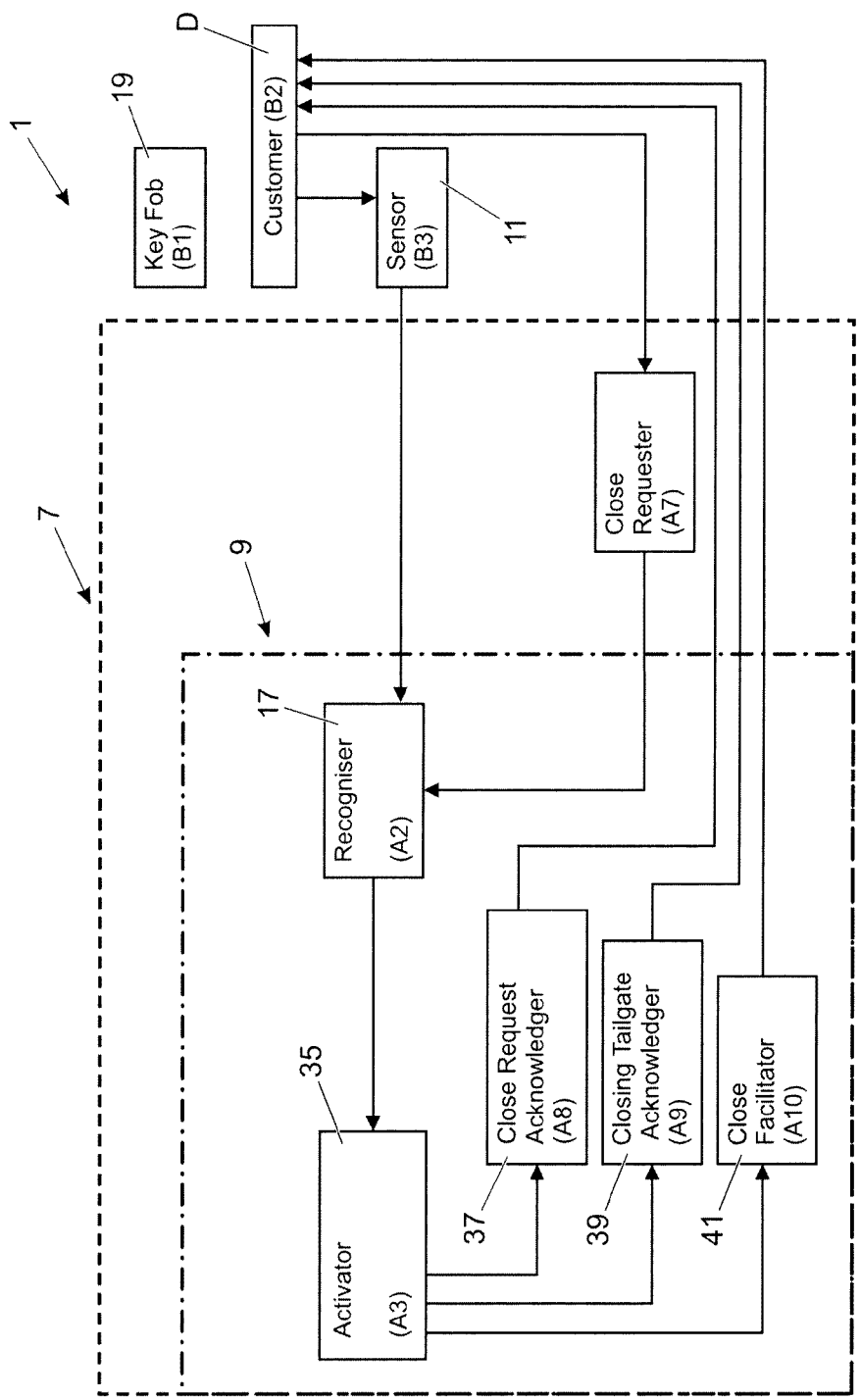

The vehicle access system 1 comprises an electronic control unit 7 having a controller 9 configured to generate control signals to control operation of the tailgate actuator to open/close the tailgate 5; and the locking mechanism to lock/unlock the tailgate 5. As shown in FIGS. 3A and 3B, the controller 9 comprises the following control modules: an activator 35, a request acknowledger 37, a tailgate acknowledger 39 and a tailgate facilitator 41. The activator 35 controls the request acknowledger 37, the tailgate acknowledger 39 and the tailgate facilitator 41 in opening and closing modes depending on the operating mode of the vehicle access system 1. The request acknowledger 37 is configured to provide feedback to the user D to indicate that the tailgate 5 has been primed for opening or closing. The tailgate acknowledger 39 is configured to provide feedback to the user D that the tailgate 5 is being opened or closed. The tailgate facilitator 41 is configured to control the tailgate actuator and the locking mechanism.

The controller 9 is in communication with an array of sensors 11 for tracking a positional movement pattern of a user D in relation to the vehicle 3. The controller 9 uses the data generated by the sensors 11 to track directly the position of the user D relative to the vehicle 3. For example, the controller 9 can compare the positional data (comprising a distance measurement and optionally also a directional measurement) obtained from each sensor 11 to track the position of the user D. The controller 9 can thereby generate a positional movement pattern of the user D at least substantially in real-time. The controller 9 could optionally perform vector analysis in respect of each component part of the positional movement pattern.

In the present embodiment, the sensors 11 are provided in a rear body panel 13, such as a rear protective panel or apron. The sensors 11 in the present embodiment are ultrasonic sensors 11 which are also used as a parking aid, for example forming part of an existing Parking Distance Control (PDC) system. The sensors 11 could be provided in one or more locations, for example along a rear apron, or behind a vehicle registration plate. Moreover, other sensors can be used in place of, or in combination with, the ultrasonic sensors 11. For example, capacitive sensors could be utilised. In the present embodiment, there are four sensors 11a-d but it will be appreciated that less than four or more than four sensors 11 could be utilised.

The controller 9 further comprises a storage device 15, such as a non-volatile memory, containing a plurality of movement maps which each relate to a corresponding control event controlled by the controller 9. By way of example, a first movement map corresponds to a first control event for opening the tailgate 5; and a second movement map corresponds to a second control event for closing the tailgate 5. Several of said movement maps could be associated with the same control event to provide different activation sequences. The movement maps each comprise one or more criteria. For example, the criteria can relate to one or more of the following: (a) location of the user D relative to the vehicle 3; (b) positional movement of the user D relative to the vehicle 3; (c) direction of movement of the user D relative to the vehicle 3; and (d) speed of movement of the user D relative to the vehicle 3. The criteria each correspond to the component positional movements of a multi-stage procedure. The criteria must be satisfied in sequence to initiate the corresponding control event. The movement maps are stored as coded bitmaps but other techniques could be employed. In the present embodiment, the movement maps are pre-defined, but they could be user-defined or customisable.

The controller 9 further comprises a positional comparator 17 for comparing the tracked positional movement pattern with the stored movement maps. The positional comparator 17 comprises an encoder/decoder block suitable for running a protocol engine to parse and process the positional movement pattern data. The encoder/decoder block can be connected to transponders and detectors (such as the sensors 11) through networking technologies such as Transmission Control Protocol (TCP)/Internet Protocol (IP) or through connectivity to local interconnect network (LIN) or CAN by a dedicated electronic control unit (ECU). Only when the positional movement pattern matches each of the criteria associated with one of the stored movement maps is the associated control event initiated by the controller 9. The criteria making up the first and second movement maps for respectively opening and closing the tailgate 5 will now be described.

The first movement map corresponds to a first control event for opening the tailgate 5 and comprises the following sequential opening criteria:
(i) The sensors 11 detect the user D entering an operating zone $Z_{OP}$ defined at the rear of the vehicle;
(ii) The sensors 11 detect a positional movement of the user D towards the vehicle within the operating zone $Z_{OP}$ (referred to herein as a step-in positional movement), for example a positional movement of between ten (10) and twenty (20) centimeters towards the rear of the vehicle; and
(iii) The sensors 11 detect a positional movement of the user D away from the vehicle within the operating zone $Z_{OP}$ (referred to herein as a step-out positional movement), for example a positional movement of between ten (10) and twenty (20) centimeters away from the rear of the vehicle.

The controller 9 opens the tailgate 5 automatically when these criteria have been satisfied in the above order. One or more processes can be performed in addition to these criteria. For example, the controller 9 can provide feedback to indicate that the tailgate 5 is ready to open. The feedback can be audio and/or visual, for example illuminating a dedicated light emitting diode (LED), or flashing the rear indicator lights. A time delay, for example 0.5 seconds can be introduced following completion of the step-in movement before the feedback is output to the user D. The operating zone $Z_{OP}$ can extend up to three (3) or four (4) meters from the rear of the vehicle, or can extend over a smaller region, for example up to forty (40) centimeters from the rear of the vehicle. The operating zone $Z_{OP}$ can optionally be spaced apart from the rear of the vehicle, for example a boundary of five (5) or ten (10) centimeters can be defined from the rear of the vehicle.

The second movement map corresponds to a second control event for closing the tailgate and comprises the following sequential closing criteria:
(i) The sensors 11 detect that the user D is positioned within the operating zone $Z_{OP}$, for example within a range of thirty (30) centimeters of the rear (left or right) tail lights; and
(ii) The sensors 11 detect a positional movement of the user D away from the rear of the vehicle 3 within the operating zone $Z_{OP}$ (a step-out positional movement), for example between ten (10) and twenty (20) centimeters from the rear of the vehicle 3.

The controller 9 closes the tailgate 5 automatically when these closing criteria have been satisfied in the above order. Again, the controller 9 can provide feedback to indicate that the tailgate 5 is ready to close.

When the sensors 11 form part of an existing PDC system, they are typically tuned/calibrated and mapped based on detecting objects associated with parking a vehicle. For use in conjunction with the vehicle access system 1 according to the present embodiment, the sensors are mapped to optimise measurement of the position and/or distance to the user for generation of the positional movement pattern. Based on a set of vehicle conditions which are derived from the network, the movement maps will be used so that the parking performance is not compromised and gesture recognition is optimised.

The vehicle access system 1 could be primed by a key fob 19 associated with the vehicle 3. For example, an activation button on the key fob 19 could be pressed to awaken the vehicle access system 1 and activate the sensors 11. However, in the present embodiment, the electronic control unit 7 further comprises a detector 21 for detecting the presence of the key fob 19. The key fob 19 comprises a remote transceiver for communicating with a transceiver provided in the vehicle 3. A wireless ultra-high frequency (UHF) ultra-wide band (UWB) system is used to establish a link between the vehicle 3 and the key fob 19. To minimise the power consumption of the system the vehicle 3 can broadcast a code on a specific frequency/time/code channel to which the key fob 19 can listen. The key fob 19 can be configured only to transmit after decoding this channel. Thereafter the key fob 19 can send a request to establish a link for authentication. A suitable UWB system is described in the applicant's co-pending UK application number GB1119792.8 filed on 16 Nov. 2011, the contents of which are incorporated herein in their entirety by reference.

Upon successful completion of this electronic 'handshake' procedure, the position vector variable of the key fob 19 could optionally be used by the positional movement pattern recognition procedure to open the aperture(s). In the present embodiment, the vehicle access system 1 is activated and the sensors 11 primed to track the positional movement of the user. The vehicle access system 1 is thereby activated automatically without the user having to press an activation button and can provide passive entry to the vehicle 3. By activating the sensors 11 only when they are required, power consumption can be reduced. This detection arrangement has particular application for controlling the opening of the tailgate 5. An on-board activation button, for example located in the boot (trunk) of the vehicle, can be used to activate the vehicle access system 1 for closing the tailgate 5.

The operation of the vehicle access system 1 according to the present embodiment of the present invention will now be described. The scenario in which the tailgate 5 is in a closed position will be described first. The key fob 19 is detected by the detector 21 when it comes within range of the vehicle 3 and the vehicle access system 1 is awakened and the sensors 11 activated. When the user D enters the operating zone $Z_{OP}$, the sensors 11 detect the positional movement pattern of the user D relative to the vehicle 3. The comparator 17 performs a real-time comparison of the positional movement pattern with the movement maps stored in the storage device 15 in order to determine if the user's movements correspond to a stored movement map. When the positional comparator 17 determines that the user's movements match those recorded in a stored movement map, the controller 9 activates the corresponding control event. If the generated movement pattern identifies the user D performing a step-in movement relative to the vehicle, and then performing a step-out positional movement relative to the vehicle, the controller 9 will perform the first control event to open the tailgate 5.

Specifically, the controller 9 will send an unlock control signal to the tailgate locking mechanism to unlock the tailgate and an open control signal to the tailgate actuator to open the tailgate 5.

Considering the scenario in which the tailgate 5 is in an open position, the user D primes the vehicle access system 1 by pressing a close button, for example provided inside the vehicle 3 in the vicinity of the tailgate 5 or on the key fob 19. The sensors 11 track the position of the user D and the user's positional movement pattern is compared to the stored movement maps to determine if the user's positional movement corresponds to a stored movement map. When the positional comparator determines that the positional movement of the user matches those in a stored movement map, the controller activates the corresponding control event. For example, if the generated movement pattern identifies the presence of the user D within the operating zone $Z_{OP}$ and then tracks the user D performing a step-out positional movement, the controller 9 will perform the second control event to close the tailgate 5. Specifically, the controller 9 will send a close signal to the tailgate actuator to close the tailgate 5 and optionally also a lock control signal to the tailgate locking mechanism to lock the tailgate 5.

A modified version of the vehicle access system 1 in accordance with the present invention will now be described with reference to FIG. 2. Like reference numerals will be used for like components.

The vehicle access system 1 is modified to define inner, intermediate and outer primary operating zones A-L associated with each of the four sensors 11a-d. In addition, first and second secondary operating zones O, P are defined on the left and right hand sides respectively of the primary operating zones A-L. An aft secondary operating zone Q is defined to the rear of the primary operating zones A-L; and third and fourth secondary operating zones M, N are defined on the left and right hand sides respectively of the vehicle 3. Thus, a total of seventeen operating zones A-Q are defined in relation to the sensors 11a-d. The operating zones A-Q assist with the logic for implementing a control algorithm. This arrangement can provide increased accuracy in the measurement of the positional movement pattern as the user moves in relation to the vehicle 3. The sensors 11a-d can detect the presence or absence of a user in each operating zone A-Q as well as the movement of the user within each operating zone A-Q. The third and fourth secondary operating zones M, N could be monitored by the outermost sensors 11a, 11d, or they could be monitored by separate sensors such as blind-spot sensors. The size and position of each operating zone A-Q can be calibrated.

Figure 2:
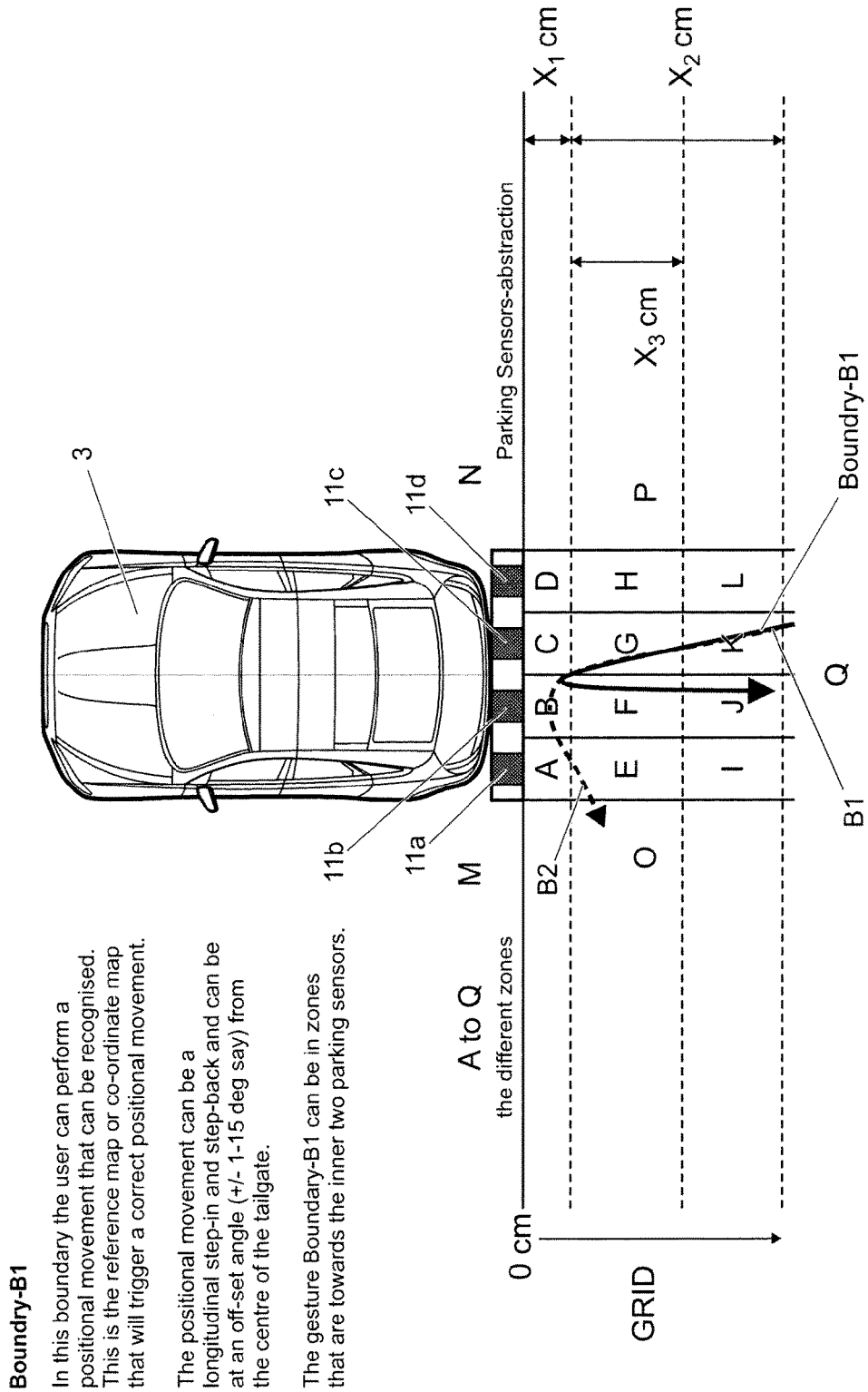
FIG. 2 shows a plan view of a vehicle having a modified version of the vehicle access system 1.

A first reference movement map B1 is illustrated in FIG. 2 by a continuous line having an arrowhead to indicate the direction of movement. The first movement map B1 represents the positional movement to be traced by a user to open or close the tailgate 5. The first movement map B1 can optionally require that the activation positional movement is performed within a first predefined region relative to the vehicle 3, for example that the activation positional movement is completed in a region between 5 cm and 40 cm from the rear of the vehicle 3. A boundary distance X1, in which the position of the user D is not tracked, is optionally defined at the outer surface of the vehicle 3 to avoid the user D having to touch the vehicle 3. The boundary distance X1 can, for example, have a depth of up to ten (10) centimeters. The first movement map B1 also comprises a step-in positional movement performed over a second minimum predefined distance X2 towards the rear of the vehicle 3, for example a positional movement of at least 5 cm, 10 cm, 20 cm or 30 cm towards the rear of the vehicle 3. The first movement map B1 can optionally also require that the step-in positional movement is performed within a second predefined region relative to the vehicle 3.

The first movement map B1 further includes a step-out positional movement over a third minimum predefined distance X3 away from the rear of the vehicle 3, for example a positional movement of at least 5 cm, 10 cm, 20 cm or 30 cm away from the rear of the of the vehicle 3. The first movement map B1 can optionally also require that the step-out positional movement is performed within a third predefined region relative to the vehicle 3. In the present embodiment, the first, second and third distances X1, X2, X3 are measured relative to the rear A-surface of the vehicle 3, but other reference points can be used. The first, second and third distances X1, X2, X3 can be calibrated independently of each other. Similarly, the first, second and third predefined regions can be calibrated.

If the components of the first movement map B1 are completed in sequence, the controller opens or closes the tailgate 5. The step-in and step-out positional movements can be measured relative to a longitudinal axis of the vehicle 3. The controller could be configured to require that the step-in positional movement and/or the step-out positional movement is/are performed substantially parallel to or coincident with said longitudinal axis. Alternatively, the controller can accommodate an angular offset between the longitudinal axis and the step-in positional movement and/or the step-out positional movement. There can be an angular offset between the step-in and step-out positional movements. For example, the step-in and/or step-out positional movements making up the first movement map B1 can each comprise an angular offset in the range of ±1° to 15° or ±1° to 30° from a longitudinal axis of the vehicle 3. The angular offset can be measured relative to a central longitudinal axis of the vehicle 3. The first movement map B1 can optionally be defined to occur near the centre of the tailgate 5. In the present embodiment, the step-in and step-out portions of the first movement map B1 must be detected by the two central sensors 11b, 11c.

It will be appreciated that the first movement map B1 can be modified, for example to require that the user performs a lateral movement after having completed a step-in movement towards the tailgate 5. By way of example, a second movement map B2 is illustrated in FIG. 2 by a dashed line. The second movement map B2 comprises a step-in component X2 to within the predefined range X1. The second movement map B2 then includes a lateral movement to a side of the vehicle 3, for example to a position adjacent to a rear tail lamp cluster.

An overview of the interaction between the vehicle 3 and the user D to open the tailgate 5 is illustrated in FIG. 3A. Conversely, an overview of the interaction between the vehicle 3 and the user D to close the tailgate 5 is illustrated in FIG. 3B. The operation of the vehicle access system 1 will now be described with reference to the first and second flow charts 100, 300 shown in FIGS. 4A and 4B.

Figure 4A:
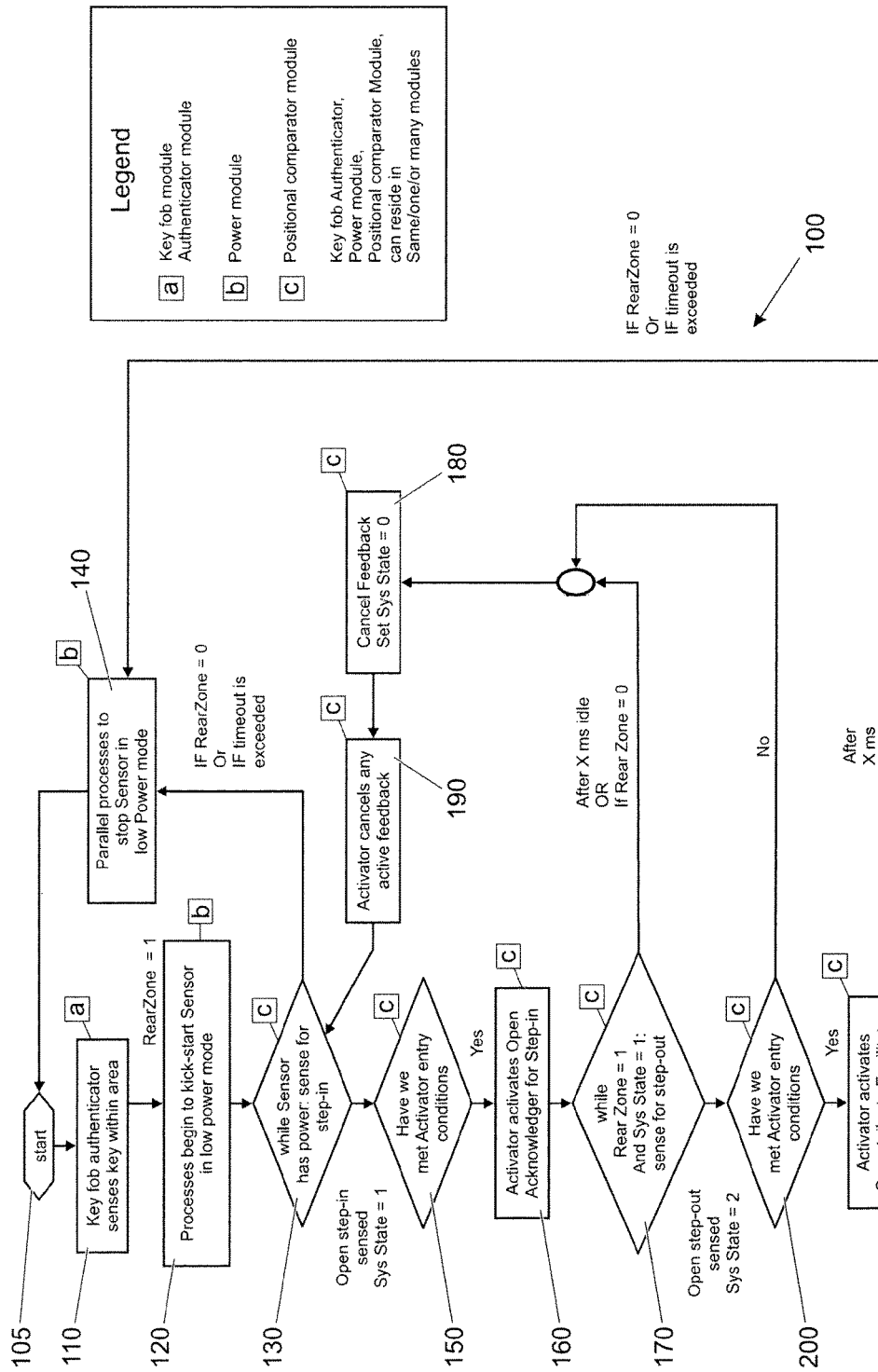
FIGS. 4A and 4B show charts illustrating the interaction between the user and the vehicle access system according to an embodiment of the present invention.

The opening sequence will be described with reference to the first flow chart 100 shown in FIG. 4A. The vehicle access system 1 is in an active state (STEP 105). The user approaches the vehicle with a key fob 19 and when it is detected within an operating range an electronic 'handshake' is performed to authenticate the key fob 19 (STEP 110). If the key fob 19 is authenticated, the controller 9 then activates the sensors 11 provided at the rear of the vehicle (RearZone=1), optionally in a low power mode (STEP 120). The sensors 11 and the positional comparator 17 operate to detect a user D performing a step-in positional movement (STEP 130). If the sensors 11 do not detect a step-in positional movement within a defined time period, the controller 9 switches the sensors 11 off and returns the vehicle access system 1 to its initial active state (STEP 140).

If the sensors 11 detect a step-in positional movement within a defined time period (System State=1), the controller 9 performs a check to determine if the entry conditions of the activator 35 have been satisfied (STEP 150). If the entry conditions have been satisfied, the activator 35 activates the request acknowledger 37 to output feedback to notify the user D that a step-in positional movement has been recognised and that a step-out positional movement should be performed to complete the opening procedure (STEP 160). Provided the key fob 19 has been authenticated (Rear Zone=1) and the step-in positional movement has been recognised (System State=1), the sensors 11 and the positional comparator 17 operate to detect a step-out positional movement (STEP 170).

If the step-out positional movement is not detected in a defined time period, the system is reset (System State=0) (STEP 180) and the activator 35 cancels any active feedback (STEP 190). The key fob 19 has been authenticated (System State=1) and the sensors 11 and the positional comparator 17 operate to detect a step-in positional movement (STEP 130). If the step-out positional movement is detected within a defined time period, a check is performed to determine if the entry conditions defined by the activator 35 have been met (STEP 200). If the entry conditions have been met, the activator 35 activates the tailgate facilitator 41 to open the tailgate 5 (STEP 210); and simultaneously activates the tailgate acknowledger 39 to provide feedback to the user D that the tailgate 5 is opening. After a defined time period, the controller 9 switches the sensors 11 off and returns the vehicle access system 1 to its initial active state (STEP 140).

Figure 4B:
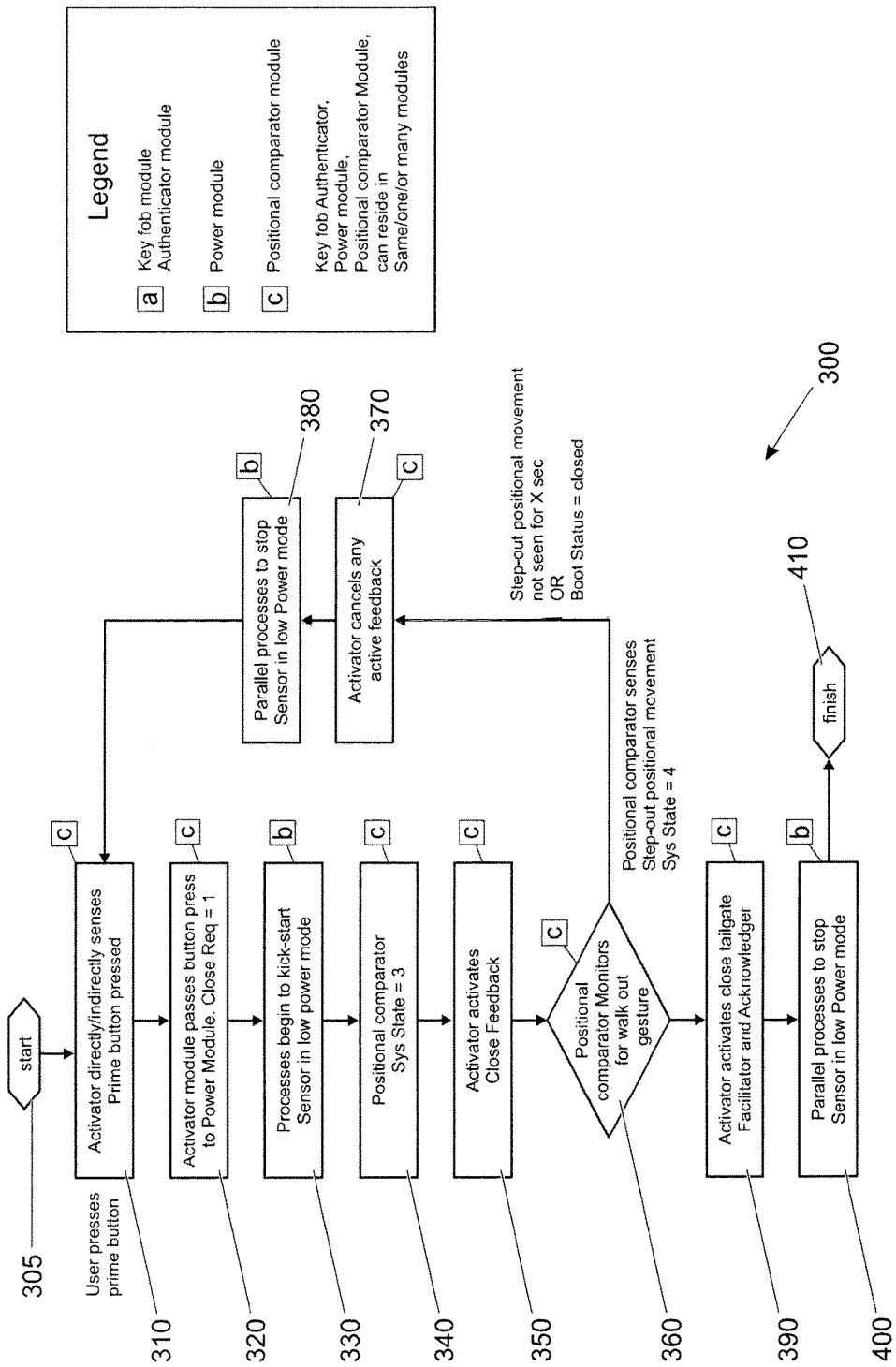

The closing sequence will be described with reference to the second flow chart 300 shown in FIG. 4B. The vehicle access system 1 is active (STEP 305). The user D awakens the vehicle access system 1 by pressing a prime button provided inside the vehicle 3 (STEP 310). The activator 35 passes a control signal from the prime button to a power module (STEP 320) to activate the sensors 11 (Close Required=1), optionally in a low power mode (STEP 330). The activator 35 configures the positional comparator 17 to detect a step-out positional movement (System State=3) (STEP 340) and activates the request acknowledger 37 to output feedback to notify the user D that a step-out positional movement should be performed to complete the closing procedure (STEP 350). The sensors 11 and the positional comparator 17 then seek to detect a step-out positional movement (STEP 360).

If the step-out positional movement is not detected within a defined time period, the activator 35 cancels any active feedback (STEP 370), switches the sensors 11 off (STEP 380) and the vehicle access system 1 is returned to its initial state awaiting activation of the prime button (STEP 310). If the step-out positional movement is detected within the defined time period (System State=4), the activator 35 activates the tailgate facilitator 41 to close the tailgate 5 (STEP 390); and simultaneously activates the tailgate acknowledger 39 to provide feedback to the user D that the tailgate 5 is closing. The activator 35 then switches the sensors 11 off and the closing sequence is completed (STEP 410).

A further embodiment of a vehicle access system 1 in accordance with the present invention will now be described with reference to FIGS. 5 and 6. Like reference numerals will be used for like components. The vehicle access system 1 according to the above embodiment used an array of sensors 11 to track the positional movement of the user D directly. In contrast, the vehicle access system 1 according to the present embodiment utilises an ultra-wide band (UWB) transceiver network to track the positional movement of a key fob 19 carried on the person of the user, thereby tracking the position of the user D indirectly. This arrangement can provide an extension of passive entry and passive starting (PEPS) systems.

Figure 5:
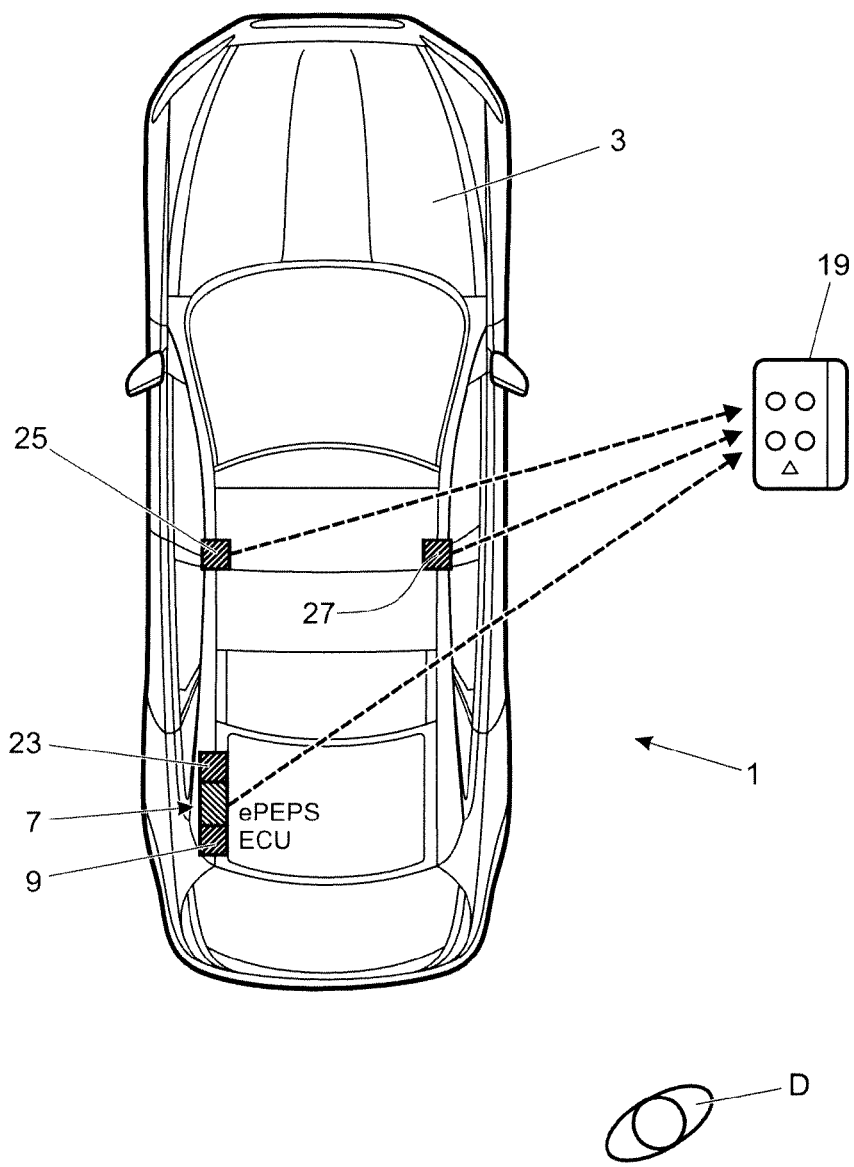
FIG. 5 shows a plan view of a vehicle having a vehicle access system according to a further embodiment of the present invention.
Figure 6:
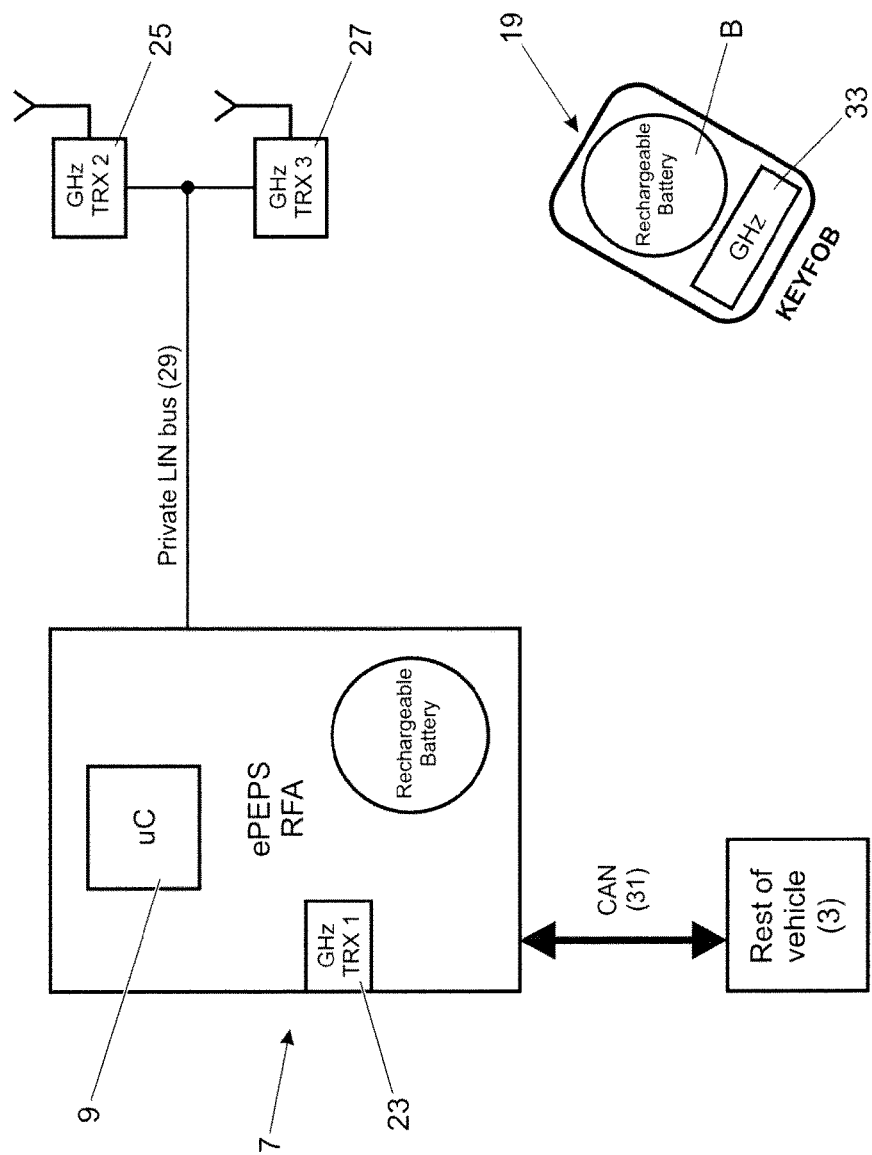
FIG. 6 shows a schematic representation of the vehicle access system shown in FIG. 5.

As shown in FIG. 5, the vehicle access system 1 comprises an electronic control unit 7 having a controller 9 and three ultra-wideband transceivers 23, 25, 27. The transceivers 23, 25, 27 each have an integrated antenna and are connected to the electronic control unit 7 via a dedicated LIN 29. Alternatively, the transceivers 23, 25, 27 could communicate through networking technologies such as TCP or IP. The controller 9 is also connected to vehicle systems, including the tailgate actuator and a tailgate locking mechanism, via a CAN bus 31. The controller 9 can thereby control opening/closing; locking/unlocking of the tailgate 5. The ultra-wideband transceivers 23, 25, 27 have an operating frequency of between 3.1 GHz and 10.6 GHz and can enable high bandwidth communications with low power consumption. A suitable operating protocol is provided under IEEE 802.15.4a. Furthermore, the sub-set of UWB frequencies designated as Band Group 6 (consisting of Bands #9, #10 and #11, ranging from 7392 MHz to 8976 MHz) can be used.

The key fob 19 for use in accordance with the present embodiment of the vehicle access system 1 is PEPS enabled and comprises a remote ultra-wideband transceiver 33 and a rechargeable battery B. The combination of PEPS and an ultra-wideband transceiver 33 is referred to herein as enhanced-PEPS (ePEPS). The key fob 19 is portable and is typically carried on the person of the user. The key fob 19 communicates with the controller 9 to enable passive entry to the vehicle via the tailgate 5.

The controller 9 and the first transceiver 23 are located at the rear of the vehicle 3 and the second and third transceivers 25, 27 are located in the upper part of the vehicle (typically in the roof) on the right and left sides respectively of the vehicle 3. The transceivers 23, 25, 27 communicate with the remote transceiver 33 provided in the key fob 19. The distance from each of the first, second and third transceivers 23, 25, 27 to the remote transceiver 33 can be determined by measuring transmission and/or response time (for example, time of flight for a signal transmission) thereby allowing the position of the key fob 19 in relation to the vehicle 3 to be determined through triangulation. The use of ultra-wideband frequencies (typically greater than 3 GHz) allows the position of the key fob 19 to be tracked with a relatively high degree of accuracy.

To minimise power consumption, the first transceiver 23 broadcasts a code on a specific frequency/time/code channel to be received by the remote transceiver 33. The remote transceiver 33 can be configured to transmit only after decoding the channel. Thereafter, the remote transceiver 33 can transmit a request to establish an authentication link. The electronic control unit 7 validates the response signal and the position vector of the key fob 19 can be used by the transceivers 23, 25, 27 to track the position of the remote transceiver 33. The second and third transceivers 25, 27 could operate continuously with the first transceiver or they could optionally be activated only once the electronic 'handshake' with the remote transceiver 33 has been successfully completed via the first transceiver 23.

If the response signal is not authenticated, the electronic control unit 7 does not track the location of the key fob 19 and no further action is taken. If the response signal is authenticated, the electronic control unit 7 continues to communicate with the key fob 19 and tracks its position (both range and position) in relation to the vehicle 3 by triangulation. The electronic control unit 7 generates a positional movement pattern based on the triangulated position of the key fob 19 in relation to the vehicle 3. The electronic control unit comprises a positional comparator 17 for performing a comparison of the positional movement pattern with a set of stored movement maps. If the positional movement pattern matches one of the stored movement maps, the controller 9 will initiate a control event associated with the identified movement map. The stored movement maps described above can be utilised in this embodiment of the present invention.

While ePEPS is capable of sensing gestures when the person is carrying a key fob 19 under some use cases, the combined use of the sensors 11 (for example forming part of the PDC system) can provide enhanced functionality. For example a locked vehicle where the tailgate has been opened either manually or using gesture detection can be closed and locked without the key present using the close gesture.

At least in certain embodiments, the ePEPS and sensors 11 can share target data over a communications network. For example the improved resolution of the sensors 11 will allow the gesture recognition detection to start before the ePEPS system detects the key is moving, thereby providing improved dynamic performance.

The sensors 11 can also detect the proximity of objects such as another vehicle which is too close to allow the tailgate (or side door) to open safely without causing damage to the vehicle or injury to the user. By sharing data between the systems, a warning can be output to the user before leaving the vehicle that the gesture system is inhibited due to the proximity of objects. The sensors 11 can comprise capacitive sensors and/or ultrasonic sensors and the data generated by the various sensors 11 can be combined to provide improved accuracy.

Opening and closing the tailgate is normally achieved by a step-in and step-out directly behind the rear of the vehicle. In situations where there is restricted access to rear of the vehicle, for example the vehicle is parked too close to another vehicle, an alternative movement map could be selected. The sensors 11 could be configured to detect this scenario and automatically select an alternate movement map (or set of movement maps). The alternative movement map(s) can, for example, be selected to allow the user to approach the rear of the vehicle from either to the left or right hand side at an angle.

It will be appreciated that various changes and modifications can be made to the embodiments described herein without departing from the spirit and scope of the present invention.

For example, the movement sequences required to initiate the control events can be altered. The movement sequences could be modified for different vehicle configurations. For example, if the tailgate is hinged at the side, the movement sequences could be modified to require that the user steps to a particular side of the vehicle. Equally, if the vehicle has a split tailgate, different movement sequences could be associated with each section of the tailgate.

Aspects of an embodiment of the present invention are set out in the following numbered paragraphs.

1. A vehicle access system comprising:
    a tracking system for tracking a positional movement pattern of a user relative to the vehicle;
    a controller for controlling the opening and/or closing of a vehicle opening, the controller being in communication with a storage device and said tracking means;
    wherein the controller comprises a comparator for comparing the positional movement pattern with one or more pre-defined movement maps stored in said storage device; and
    the controller being configured to open the vehicle opening when said comparator determines that the positional movement pattern at least substantially corresponds to a first of said one or more pre-defined movement maps; and/or to close the vehicle opening when the comparator determines that the positional movement pattern at least substantially corresponds to a second of said one or more pre-defined movement maps;
    wherein said tracking means comprises an ultrasonic range sensor and/or a capacitive range sensor for measuring the distance to the user to generate said positional movement pattern.

2. A vehicle access system as described in paragraph 1, wherein said first movement map comprises at least one opening criterion, the controller being configured to open the vehicle opening when the comparator determines that the positional movement pattern corresponds to the or each of said at least one opening criterion defined by said first movement map.

3. A vehicle access system as described in paragraph 1, wherein said second movement map comprises at least one closing criterion, the controller being configured to close the vehicle opening when the comparator determines that the positional movement pattern corresponds to the or each of said at least one operating criterion defined by said second movement map.

4. A vehicle access system as described in paragraph 2, wherein said first movement map and/or said second movement map comprise a direction criterion relating to one or more of the following: a direction of movement of a user relative to the vehicle; the approach direction of a user relative to the vehicle; and the departure direction of a user relative to the vehicle.

5. A vehicle access system as described in paragraph 2, wherein said first movement map and/or said second movement map comprise a distance criterion relating to the distance of the user from the vehicle; or the distance of the user from a reference point on the vehicle.

6. A vehicle access system as described in paragraph 2, wherein said controller is configured to provide feedback when the comparator determines that the positional movement pattern corresponds to one or more of said operating criteria defined by said first movement map and/or said second movement map.

7. A vehicle access system as described in paragraph 1 further comprising a detector for detecting the presence of a remote transceiver; and optionally also a transceiver for communicating with the remote transceiver.

8. A vehicle access system as described in paragraph 7, wherein said controller is configured to activate the tracking means upon detection of the remote transceiver by said detector.

9. A vehicle access system as described in paragraph 1, wherein a plurality of different first movement maps are stored in said storage device for opening the vehicle opening; and/or a plurality of different second movement maps are stored in said storage device for closing the vehicle opening.

10. A vehicle access system as described in paragraph 1, wherein said vehicle access system is configured to control the opening and/or closing of a tailgate.

11. A vehicle comprising a vehicle access system as described in paragraph 1.

12. A method of controlling access to a vehicle, the method comprising:
tracking a positional movement pattern of a user relative to the vehicle;
comparing the positional movement pattern with one or more pre-defined movement maps; and
identifying one of said pre-defined movement maps associated with the positional movement pattern and controlling access to the vehicle based on the identified movement map;
wherein an ultrasonic range sensor and/or a capacitive range sensor is used to measure the distance to the user to generate said positional movement pattern.

13. A method as described in paragraph 12, wherein said one or more pre-defined movement maps each comprise one or more operating criterion; and comparing the positional movement pattern comprises the sequential comparison of each operating criterion with one or more components of the positional movement pattern.

The invention claimed is:

1. A vehicle access system comprising:
a sensor for tracking a positional movement pattern of a user,
the positional movement pattern including a change in position of the user relative to a vehicle; and
a controller for controlling a vehicle opening,
the controller being hi communication with a storage device and said sensor;
wherein the controller comprises a comparator for comparing the positional movement pattern with two or more pre-defined movement maps stored in said storage device;
the controller being configured to open the vehicle opening when
said comparator determines that the positional movement pattern at least substantially corresponds to a first movement map of said two or more pre-defined movement maps;
the controller being configured to close the vehicle opening when the comparator determines that the positional movement pattern at least substantially corresponds to a second movement map of said two or more pre-defined movement maps;
wherein said sensor comprises at least one of an ultrasonic range sensor and a capacitive range sensor which, in use, measures a distance from the vehicle or a predefined reference point on the vehicle to the user and a direction of movement of the user to generate said positional movement pattern; and
wherein at least one of said first movement map and said second movement map comprises a direction criterion relating to one or more of the following:
a direction of movement of the user relative to the vehicle, an approach direction of movement of the user relative to the vehicle, and a departure direction of movement of the user relative to the vehicle;
wherein the first movement map corresponds to a first sequence of positional movements of the user comprising:
the user entering an operating zone defined near a selected portion of the vehicle;
a first positional movement of the user toward the vehicle within the operating zone after entering the operating zone, wherein the first positional movement is across a first distance within a first predefined range: and
a second positional movement of the user away from the vehicle and within the operating zone after the first positional movement, wherein the second positional movement is across a second distance within a second predefined range;
wherein the second movement map corresponds to a second sequence of positional movements of the user comprising the user being in the operating zone and a third positional movement of the user within the operation zone and away from the vehicle across a third distance within a third predefined range; and
wherein
(i) at least one of the two or more pre-defined movement maps comprises a timing criterion that defines a time that the user is to remain within the operating zone:
or
(ii) there are a plurality of operating zones defined relative to the vehicle or the reference point on the vehicle, and at least one of the two or more pre-defined movement maps defines a path of the user through a series of the operating zones.

2. A vehicle access system as claimed in claim 1, wherein said first movement map comprises at least one opening criterion, the controller being configured to open the vehicle opening when the comparator determines that the positional movement pattern corresponds to the at least one opening criterion.

3. A vehicle access system as claimed in claim 1, wherein said second movement map comprises at least one closing criterion, the controller being configured to close the vehicle opening when the comparator determines that the positional movement pattern corresponds to the at least one closing criterion.

4. A vehicle access system as claimed in claim 1, wherein at least one of said first movement map and said second movement map comprises a distance criterion relating to the distance of the user from the vehicle or the distance of the user from the reference point on the vehicle.

5. A vehicle access system as claimed in claim 1, wherein said controller is configured to provide feedback when the comparator determines that the positional movement pattern corresponds to one or more operating criteria defined by at least one of said first movement map and said second movement map.

6. A vehicle access system as claimed in claim 1 comprising a detector configured for at least one of detecting the presence of a remote transceiver and communicating with the remote transceiver.

7. A vehicle access system as claimed in claim 6, wherein said controller is configured to activate the sensor upon detection of the remote transceiver by said detector.

8. A vehicle access system as claimed in claim 1, wherein the storage device comprises at least one of
a plurality of different first movement maps stored in said storage device for opening the vehicle opening; and
a plurality of different second movement maps stored in said storage device for closing the vehicle opening.

9. A vehicle access system as claimed in claim 1, wherein said vehicle access system is configured to control at least one of opening and closing a tailgate.

10. A vehicle access system as claimed in claim 1, comprising an ultra-wideband transceiver disposed in a key fob and arranged to communicate with said controller.

11. A vehicle access system as claimed in claim 10, wherein said controller is configured to generate said positional movement pattern based on a combination of data from said ultra-wideband transceiver and at least one of said ultrasonic and capacitive range sensor.

12. A method of controlling access to a vehicle, the method comprising:
   tracking a positional movement pattern of a user, the positional movement pattern including a change in position of the user relative to the vehicle;
   comparing the positional movement pattern with two or more pre-defined movement maps; and
   identifying one of said pre-defined movement maps associated with the positional movement pattern and controlling access to the vehicle based on the identified movement map;
   wherein at least one of an ultrasonic range sensor and a capacitive range sensor is used to measure a distance from the vehicle or a pre-defined reference point on the vehicle to the user and a direction of movement of the user to generate said positional movement pattern; and
   wherein at least one of said movement maps comprises a direction criterion relating to one or more of the following: a direction of movement of the user relative to the vehicle, an approach direction of movement of the user relative to the vehicle, and a departure direction of movement of the user relative to the vehicle;
   wherein a first of said two or more pre-defined movement maps corresponds to a first sequence of positional movements of the user comprising:
      the user entering an operating zone defined near a selected portion of the vehicle;
      a first positional movement of the user toward the vehicle within the operating zone after entering the operating zone, wherein the first positional movement is across a first distance within a first pre-defined range; and
      a second positional movement of the user away from the vehicle and within the operating zone after the first positional movement, wherein the second positional movement is across a second distance within a second predefined range;
   wherein a second of said two or more movement maps corresponds to a second sequence of positional movements of the user comprising the user being in the operating zone and a third positional movement of the user within the operation zone and away from the vehicle across a third distance within a third predefined range; and
   wherein
   (i) at least one of the two or more pre-defined movement maps comprises a timing criterion that defines a time that the user is to remain within the operating zone;
   or
   (ii) there are a plurality of operating zones defined relative to the vehicle or the reference point on the vehicle, and at least one of the two or more pre-defined movement maps defines a path of the user through a series of the operating zones.

13. A method as claimed in claim 12, wherein said two or more pre-defined movement maps each comprise one or more operating criterion; and comparing the positional movement pattern comprises a sequential comparison of each operating criterion with one or more components of the positional movement pattern.

14. A vehicle access system comprising:
   tracking means for tracking a positional movement pattern of a user, the positional movement pattern including a change in position of the user relative to a vehicle; and
   a controller for controlling a vehicle opening, the controller being in communication with a storage device and said tracking means;
   wherein the controller comprises a comparator for comparing the positional movement pattern with two or more pre-defined movement maps stored in said storage device;
   the controller being configured to open the vehicle opening when said comparator determines that the positional movement pattern at least substantially corresponds to a first movement map of said two or more pre-defined movement maps;
   the controller being configured to close the vehicle opening when the comparator determines that the positional movement pattern at least substantially corresponds to a second movement map of said two or more pre-defined movement maps;
   wherein said tracking means comprises an ultra-wideband transceiver disposed in a key fob and arranged to communicate with said controller, wherein the controller is operable to calculate a distance from the vehicle or a pre-defined reference point on the vehicle to the key fob and the direction of movement of the key fob to generate said positional movement pattern; and
   wherein at least one of said first movement map and said second movement map comprises a direction criterion relating to one or more of the following: a direction of movement of the user relative to the vehicle, an approach direction of movement of the user relative to the vehicle, and a departure direction of movement of the user relative to the vehicle;
   wherein the first movement map corresponds to a first sequence of positional movements of the user comprising:
      the user entering an operating zone defined near a selected portion of the vehicle;
      a first positional movement of the user toward the vehicle within the operating zone after entering the operating zone, wherein the first positional movement is across a first distance within a first pre-defined range; and
      a second positional movement of the user away from the vehicle and within the operating zone after the first positional movement, wherein the second positional movement is across a second distance within a second predefined range;
   wherein the second movement map corresponds to a second sequence of positional movements of the user comprising the user being in the operating zone and a third positional movement of the user within the operation zone and away from the vehicle across a third distance within a third predefined range; and
   wherein
   (i) at least one of the two or more pre-defined movement maps comprises a timing criterion that defines a time that the user is to remain within the operating zone;

or
(ii) there are a plurality of operating zones defined relative to the vehicle or the reference point on the vehicle, and at least one of the two or more predefined movement maps defines a path of the user through a series of the operating zones.

\* \* \* \* \*

UNITED STATES PATENT AND TRADEMARK OFFICE
CERTIFICATE OF CORRECTION

PATENT NO. : 10,196,037 B2  
APPLICATION NO. : 14/438290  
DATED : February 5, 2019  
INVENTOR(S) : Stephen Nicholls et al.

Page 1 of 1

It is certified that error appears in the above-identified patent and that said Letters Patent is hereby corrected as shown below:

In the Claims

In Claim 1, Column 15, Line 35; replace "hi communication" with --in communication--

Signed and Sealed this
Twenty-ninth Day of October, 2019

Andrei Iancu
*Director of the United States Patent and Trademark Office*